Figure 2B:
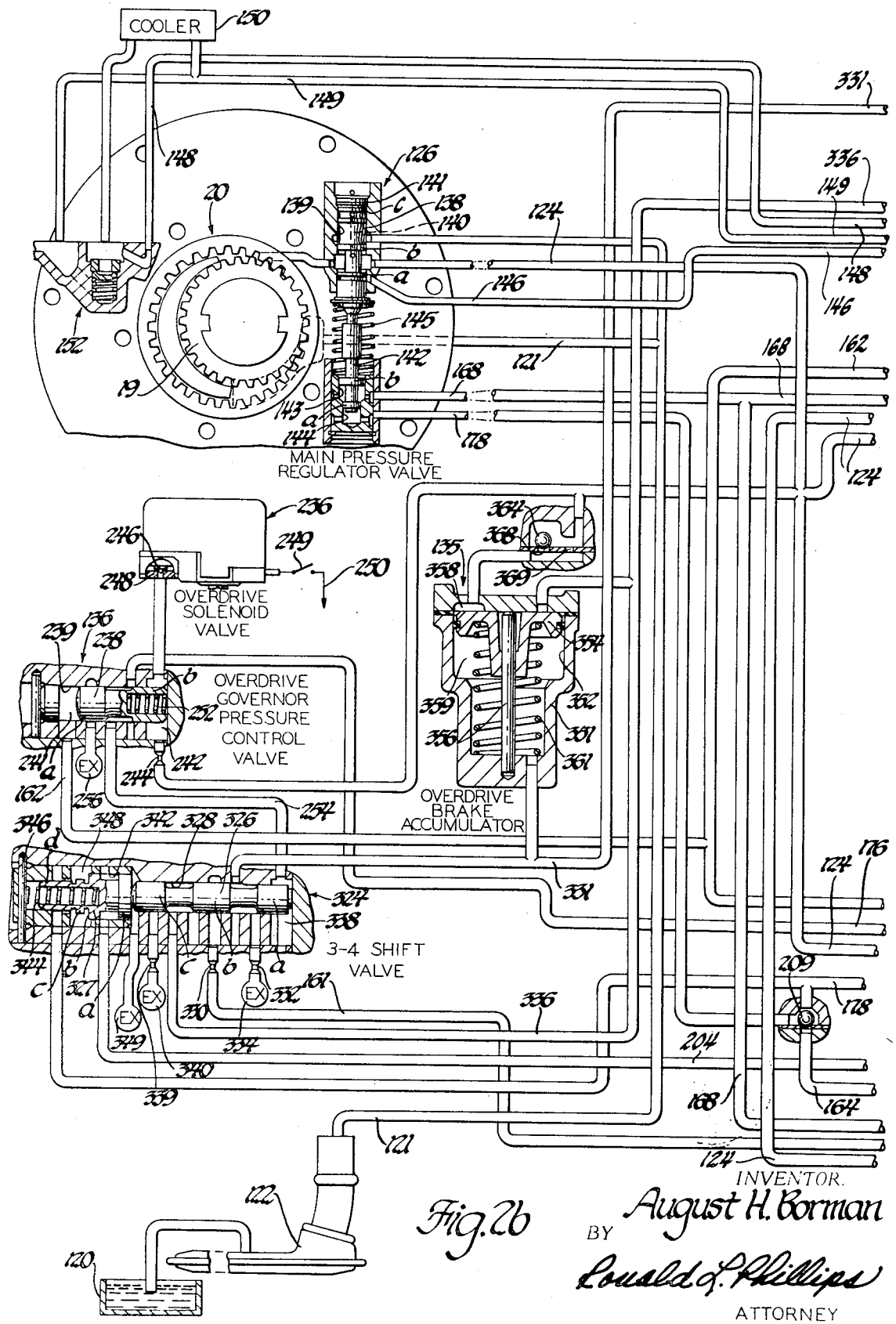

United States Patent [19]
Borman

[11] 3,724,292
[45] Apr. 3, 1973

[54] TRANSMISSION CONTROL

[75] Inventor: August H. Borman, Farmington, Mich.

[73] Assignee: General Motors Corporation, Detroit, Mich.

[22] Filed: Mar. 12, 1971

[21] Appl. No.: 123,625

[52] U.S. Cl. .........................74/864, 74/763, 74/869
[51] Int. Cl. ...............................................B60k 21/02
[58] Field of Search...............................74/864–869

[56] References Cited

UNITED STATES PATENTS

| | | | |
|---|---|---|---|
| 2,908,181 | 10/1959 | Smirl | 74/869 X |
| 2,926,543 | 3/1960 | Holdeman et al. | 74/869 |
| 3,001,415 | 9/1961 | Smirl | 74/864 X |
| 3,236,117 | 2/1966 | Christenson | 74/869 |
| 3,497,043 | 2/1970 | Leonard | 74/869 X |
| 3,625,090 | 12/1971 | Chana | 74/869 X |

*Primary Examiner*—Charles J. Myhre
*Assistant Examiner*—Thomas C. Perry
*Attorney*—W. E. Finken, A. M. Heiter and R. L. Phillips

[57] ABSTRACT

An automatic transmission control having an overdrive shift valve whose operation is controlled by an overdrive governor pressure control valve which in turn is controlled by an overdrive solenoid valve that is under vehicle operator control, there being further included an overdrive accumulator that operates to establish fluid delivery for establishment of all of the transmission's lower speed drives and also operates as both a valve and an accumulator to effect establishment of and cushion overdrive engagement.

3 Claims, 5 Drawing Figures

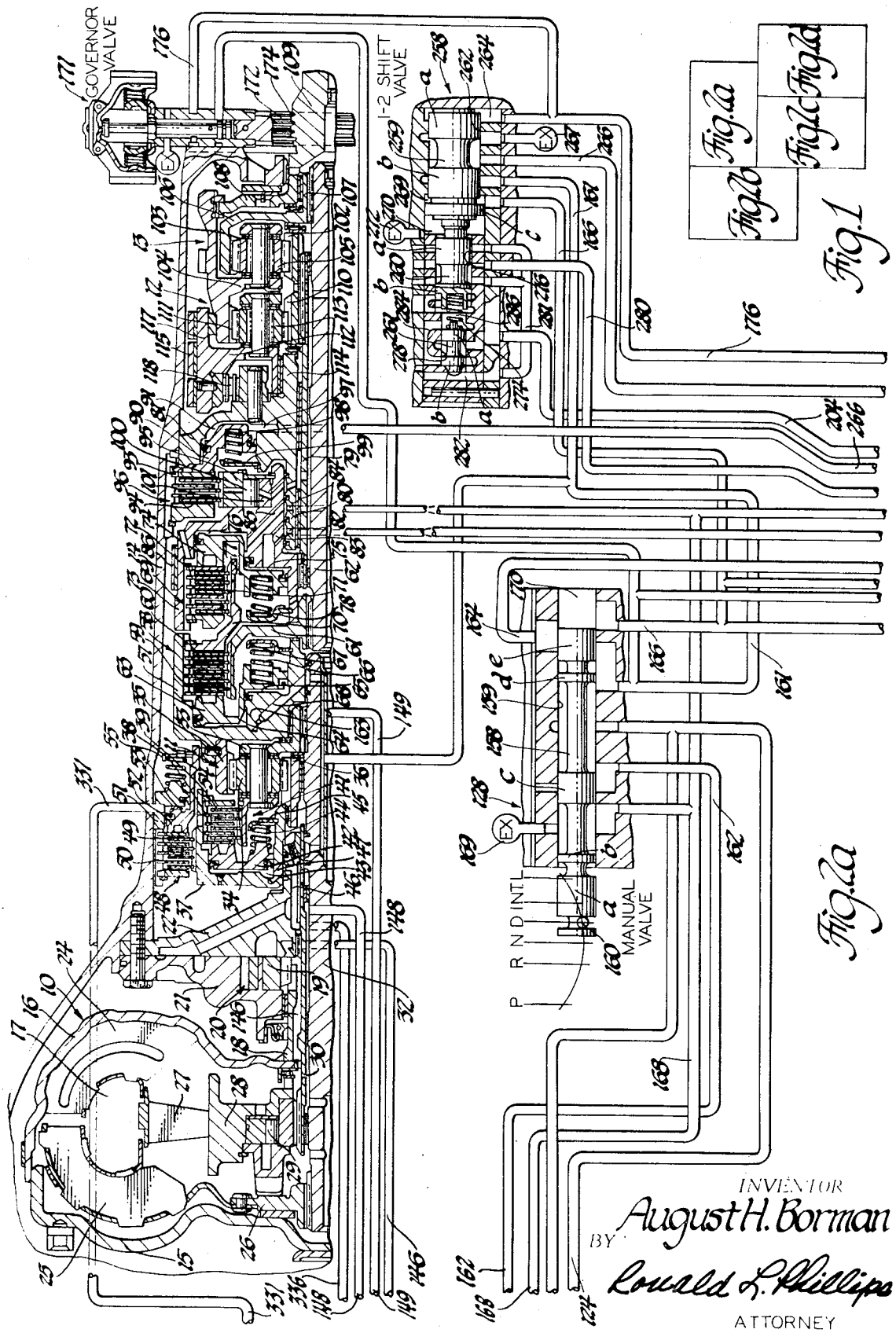

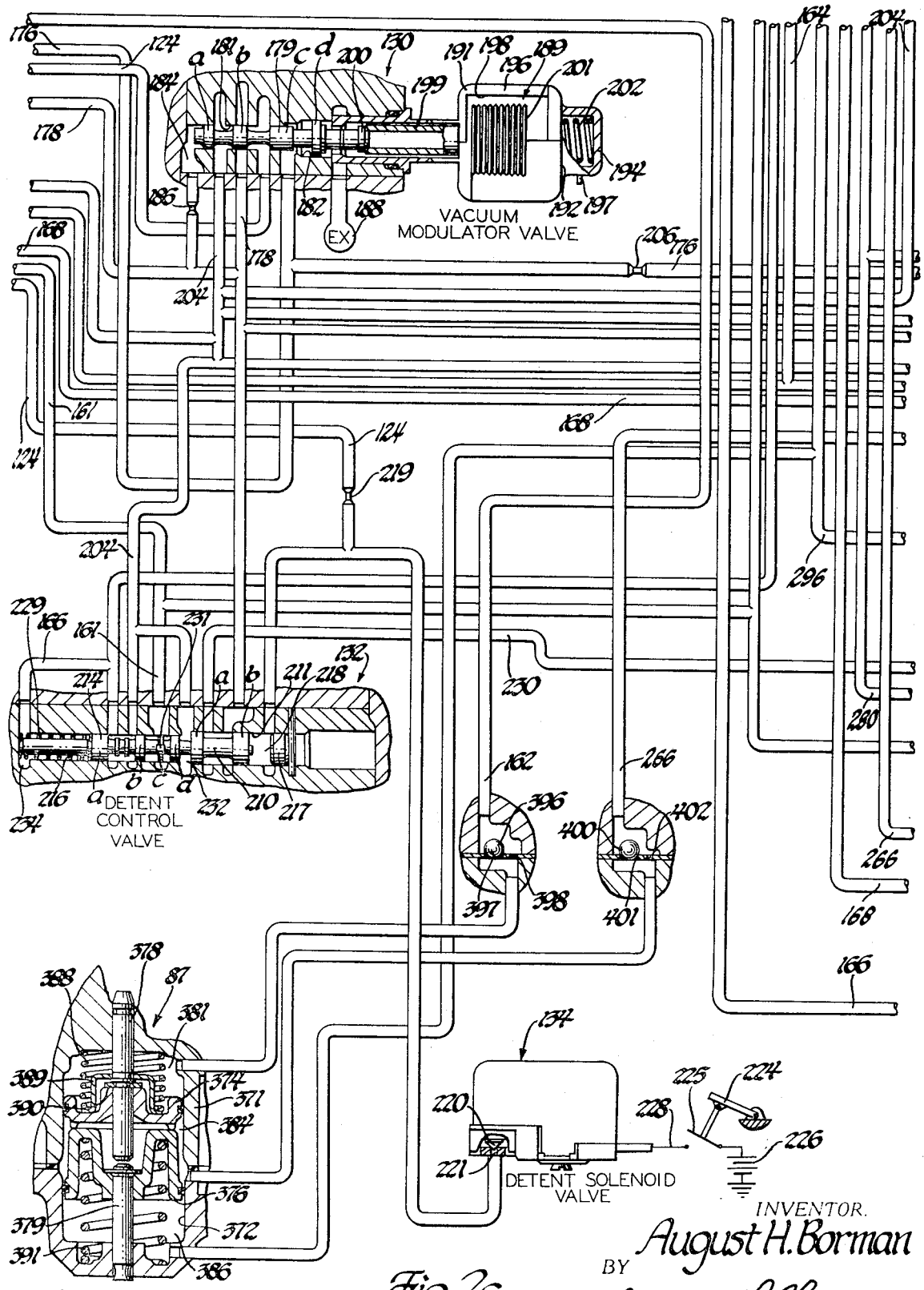

3,724,292

TRANSMISSION CONTROL

This invention relates to transmission controls and more particularly to transmission controls for providing shifting to and from overdrive.

The transmission control according to the present invention offers a simple system for controlling shifting to and from overdrive and includes an overdrive shift valve, an overdrive governor pressure control valve, an overdrive solenoid valve and an overdrive accumulator. In all of the transmission drives below overdrive the overdrive accumulator provides for delivering fluid pressure to establish direct drive through overdrive gearing and then to establish overdrive operates as a valve to discontinue direct drive by the overdrive gearing while providing pressure control to cushion overdrive engagement. The overdrive shift valve is normally spring biased to a downshift position in all drives below overdrive and this spring bias is assisted by a modulator pressure reflective of load torque demand to oppose a governor pressure that changes with load speed and acts to urge the overdrive shift valve to its upshift position to effect establishment of the overdrive. Governor pressure supply to the overdrive shift valve is controlled by an overdrive governor pressure control valve which is spring biased to a position preventing governor pressure delivery and is normally biased by fluid pressure to a governor shut-off position when the transmission is conditioned for automatic shifting. An overdrive solenoid valve under the control of the vehicle operator controls the establishment of another fluid pressure bias on the overdrive governor pressure control valve to assist the overdrive governor pressure control valve spring bias and urge this valve to its overdrive shift permit position to permit shifting to overdrive.

An object of the present invention is to provide a new and improved transmission control for shifting to and from overdrive.

Another object is to provide a transmission control having an overdrive shift valve that operates in response to both load torque demand and load speed to effect shifting to and front overdrive and with shifting occurring at a predetermined minimum vehicle speed and with the governor pressure bias being under the manual control of the vehicle operator.

Another object is to provide in a transmission control for shifting to and from overdrive an overdrive shift valve that has an upshift bias that changes with load speed and a downshift bias provided by a spring plus a bias that changes with load torque demand and with the establishment of the upshift bias controlled by a normally shift prevent biased valve that is in turn controlled to permit shifting by a manually controlled solenoid valve and with there being further included an overdrive accumulator that operates to deliver fluid pressure to lock out overdrive and also operates to cushion engagement of overdrive while preventing the lock out.

These and other objects will be more apparent from the following description and drawing in which:

A transmission and a control system therefor according to the present invention are shown in FIGS. 2a, 2b, 2c and 2d when arranged as indicated by FIG. 1.

TRANSMISSION DRIVE ARRANGEMENT

Referring to FIG. 2a there is shown a transmission for a passenger car generally comprising a hydrodynamic torque converter 10, an overdrive and direct drive gear unit 11, and lower ratio drive gear units 12 and 13 all housed in a transmission housing 14. The transmission is operable to provide four forward speed range drives, neutral and reverse drive. The four forward speed range drives include first gear reduction drive, second gear reduction drive, direct drive and overdrive.

Describing now the transmission's structural details, an engine driven housing cover 15 and connected impeller cover 16 rotate at engine speed and enclose a fluid chamber 17. Cover 16 drives through a sleeve 18, a pump drive gear 19 of a pump 20 which is shown in both FIGS. 2a and 2b, the sleeve 18 being welded to the cover 16 and having a drive lug connection to the gear 19. Pump 20 is located in a pump housing 21 bolted to a transmission support web 22, the web being secured by these same bolts to transmission housing 14. Torque converter 10 includes a series of impeller or pump vanes 24 carried by cover 16, turbine vanes 25 carried by a hub 26 and reaction or stator vanes 27 which are supported on a reaction hub 28 and are disposed between the inner ends of the turbine and impeller vanes. Reaction vanes 27 and hub 28 are permitted free rotation in the same direction as the impeller and turbine vanes which is the forward direction by a one-way roller type brake 29 disposed between hub 28 and a ground sleeve 30 that is press fitted to support web 22. One-way brake 29 prevents reverse rotation of reaction vanes 27 and hub 28 under the influence of circulating fluid in the converter. Turbine hub 26 is splined to a turbine shaft 32 which transmits the turbine drive to the forwardly located overdrive and direct drive gear unit 11.

The overdrive and direct drive gear unit 11 is operable to selectively provide an overdrive and direct drive and comprises a simple helical planetary gear set having a planet carrier 33 splined to and thus driven by turbine shaft 32. Carrier 33 supports planet gears or pinions 34 in mesh with a ring gear 35 and an annular sun gear 36. A clutch drum 37 is drivingly connected to sun gear 36 by having helical splines engaging extensions of the helical teeth of sun gear 36 as shown. This drum and sun gear connection is maintained without providing added axial stop means by the equal and opposite torques on drum 37 and sun gear 36 during operation. The clutch drum 37 is also drivingly connected by splines to a plurality of friction plates 38 that are adapted to engage friction plates 39. The plates 39 are drivingly connected by splines to planet carrier 33, the plates 38 and 39 forming a part of a lockout clutch indicated generally as 41. A piston 42 forms with drum 37, a servo chamber 43 that is adapted to receive fluid under pressure to engage lockout clutch 41. Springs 44 seated upon a spring seat 45 on drum 37 bias piston 42 towards its release position. Fluid under pressure may be admitted to servo chamber 43 through passages 46 and 47 in support web 22 and drum 37, respectively.

An overdrive brake indicated generally at 48 comprises friction plates 49 which are connected by splines to drum 37 and are adapted to engage friction plates 50. The plates 50 are connected by splines to a brake housing 51 which is fixed to transmission housing 14. A piston 52 forms with housing 51 a servo chamber 53 that is adapted to receive fluid under pressure to engage overdrive brake 48. Springs 54 seated at one end upon the stationary brake housing 51 and at the other end on a spring seat 55 carried by piston 52 bias piston 52 towards its release position.

Ring gear 35 is pinned to and thus fixed for rotation with a clutch drum 57 of a forward drive clutch indicated generally at 58. Drive friction plates 59 drivingly connected by splines to drum 57 are adapted to engage driven friction plates 60 which are drivingly connected by splines to a clutch hub 61 that is splined to an intermediate drive shaft 62. A piston 63 forms with drum 57 a pair of servo chambers 64 and 65 that are adapted to receive fluid under pressure to engage forward drive clutch 58. Release springs 66 seated upon a spring seat 67 carried by drum 57 bias piston 63 towards its clutch release position. Fluid pressure for engaging forward drive clutch 58 may be admitted to chambers 64 and 65 by a passage 68 through turbine shaft 32 and clutch drum 57.

A direct drive clutch indicated generally at 69 comprises a drive clutch hub 70 splined to drum 57, drive friction plates 71 drivingly connected by splines to hub 70 and driven friction plates 72 which are drivingly connected by splines to a driven clutch drum 73 and are adapted to engage plates 71. A piston 74 forms with drum 73 a pair of servo chambers 75 and 76 which are adapted to receive fluid under pressure to engage direct drive clutch 69. Springs 77 seated upon a spring seat 78 carried on clutch drum 73 bias piston 74 towards its clutch release position. Clutch drum 73 is splined to the forward end of a sleeve shaft 79 and is rotatably supported upon an axially extending support boss 80 of a support web 81 which is fixed by splines to transmission housing 14. Fluid pressure may be admitted to chamber 75 through a passage 82 in boss 80 and a passage 83 in drum 73 to engage direct drive clutch 69. Fluid pressure may also be admitted to chamber 76 through a passage 84 in boss 80 and a passage 85 in drum 73 to engage direct drive clutch 69. An overrun band brake 86 grounded to the transmission housing 14 and operated by a fluid pressure operated servo motor 87 shown in FIG. 2c may, at times, be applied to hold drum 73.

The stationary support web 81 is shaped on its front side to receive a piston 90 which forms with web 81 a servo chamber 91 that is adapted to receive fluid under pressure. Friction plates 93 splined to housing 14 are adapted to engage friction plates 94 splined to a hub 95, this structure providing a second gear brake indicated generally as 96. Fluid pressure may be admitted to chamber 91 through a passage 97 in support web 81 to engage brake 96. Springs 98 seated upon a spring seat 99 carried on web 81 bias piston 90 towards its brake release position.

A one-way sprag type brake 100 is disposed between hub 95 and a race 101 that is press fitted to clutch drum 73. The one-way brake 100 operates when brake 96 is engaged to permit free forward rotation of clutch drum 73 and prevents reverse rotation.

The rear gear unit 13 comprises a simple helical planetary gear set having an annular sun gear 102, a ring gear 103 and a planet carrier 104 having planet pinions 105 in mesh with sun gear 102 and ring gear 103. The sun gear 102 is splined to the rear end of sleeve shaft 79, the ring gear 103 is formed on a drum 106 which is splined at its hub 107 to the rear end of intermediate drive shaft 62, and the carrier 104 is splined to a flange 108 that is integral with a shaft 109. The shaft 109 is supported for rotation by the transmission housing 14 as shown and serves as the transmission's output.

The gear unit 12 located forward of gear unit 13 comprises a simple helical planetary gear set having an annular sun gear 110 formed integral with sun gear 102, a ring gear 111 formed integral with carrier 104 and a planet carrier 112 having planet pinions 113 in mesh with sun gear 110 and ring gear 111. Carrier 112 is supported for rotation on a boss 114 projecting from the rear side of web 81. A low and reverse band brake 115 grounded to the transmission housing 14 and operated by a fluid pressure operated servo motor 116 shown in FIG. 2d is adapted to engage a brake drum 117 formed on carrier 112. In addition to this selective holding of carrier 112, there is provided a one-way roller type brake 118 having a cam ring pinned to carrier 112 and an inner race pinned to the stationary web 81. The one-way brake 118 operates to prevent reverse rotation of carrier 112 and permits free forward rotation.

OPERATION OF THE TRANSMISSION DRIVE ARRANGEMENT

The transmission drive arrangement affords at least four forward speed range drives, neutral and a reverse speed range drive. These drives may also be called the transmission's gear ratios. The forward drives make available three forward drive ranges which will be referred to as drive range, intermediate range and low range.

For neutral, clutch 41 is engaged but all other friction drive establishing devices are released so that no power from turbine shaft 32 can be transmitted through the gearing to output shaft 109.

In drive range three forward drive ratios may be obtained with automatically operable controls including first or lowest gear drive, second gear drive and direct drive. In addition a fourth gear drive, overdrive, may be had by manual selection at vehicle speeds above a predetermined speed.

Drive range first or low gear drive is obtained by engaging lockout clutch 41 and forward drive clutch 58. Power from the forwardly rotating turbine shaft 32 is delivered through carrier 33 and ring gear 35 to clutch drum 57 with the overdrive and direct drive gear unit 11 locked up by the engaged lockout clutch 41 and thus providing a 1:1 speed ratio drive between carrier 33 and drum 57. Power flows through the engaged forward drive clutch 58 and intermediate drive shaft 62 to drive ring gear 103 in gear unit 13 forwardly. Assuming a load on output shaft 109 and thus on planet carrier 104, this carrier tends to remain stationary so that sun gears 102 and 110 in gear units 12 and 13 are driven in reverse. In gear unit 12, power input to planet pinions 113 from sun gear 110 tends to cause planet carrier 112 to rotate backwardly but such rotation is prevented by one-way brake 118. Planet pinions 113 therefore drive ring gear 111 and thus output shaft 109 forwardly. In low gear, drive is at the compound reduction ratio thus provided by the interconnected gear units 12 and 13. Due to the action of one-way brake 118, the transmission will not transmit power from output to input for engine braking in drive range low gear.

Drive range second gear drive is accomplished by retaining engagement of clutches 41 and 58 and engaging brake 96. Brake 96 and one-way brake 100 in series therewith prevent reverse rotation of clutch drum 73, shaft 79 and thus sun gears 110 and 102. Power is applied to ring gear 103 and with sun gear 102 held against reverse rotation, carrier 104 and thus output shaft 109 are driven forwardly at the reduction ratio of gear unit 13. One-way brake 100 permits free forward rotation of sun gear 102 and thus power cannot be transmitted from output to input for engine braking.

Drive range direct drive is accomplished by maintaining clutches 41 and 58 engaged and engaging direct drive clutch 69. One-way brake 100 permits forward rotation of drum 73 and thus forward drive of sun gears 110 and 102 irrespective of the retained engagement of brake 96. Since both ring gear 103 and sun gear 102 in gear unit 13 are driven at the same speed, the gear unit 13 is locked up to provide a 1:1 speed ratio or direct drive to drive output shaft 109.

Drive range overdrive is accomplished by maintaining clutches 58 and 69 and brake 96 engaged and by releasing lockout clutch 41 and engaging overdrive brake 48. With brake 48 engaged and clutch 41 released, sun gear 36 is held against rotation in either direction and ring gear 35 and connected clutch drum 57 are driven at a speed faster than shaft 32 by the overdrive ratio thus provided by gear unit 11. Since gear unit 13 is maintained in its direct drive condition by clutches 58 and 69, an overdrive gear ratio is provided to drive output shaft 109 faster than turbine shaft 32.

In intermediate range operation only the first and second gear ratios are made available since this range is intended for rapid vehicle acceleration or maximum performance and also second gear braking. For intermediate range first gear drive the clutches 41 and 58 are engaged in the same manner as when operating in drive range.

Intermediate range second gear operation is obtained by engaging clutches 41 and 58 in the same manner as when operating in drive range second gear drive except with the additional engagement of brake 96. The transmission controls in intermediate range will, however, prevent an upshift from second gear drive to direct drive regardless of vehicle speed.

Low range operation is provided primarily for overrun or downhill engine braking. First and second gear drives may be had in low range operation. Low range first gear drive is obtained by engaging clutches 41 and 58 and brake 115. Brake 115 prevents rotation of carrier 112 during overrun to provide engine braking. In low range operation the transmission controls prevent an upshift from first to second gear drive until the vehicle speed substantially exceeds the speed at which a first to second gear drive upshift occurs when operating in drive or intermediate range. Low range second gear drive is accomplished by engaging clutches 41 and 58 and brake 86 and releasing brake 115.

Reverse drive is obtained by engaging clutches 41 and 69 and brake 115. The gear unit 11 is thus locked up and provides a 1:1 speed ratio drive to ring gear 35 from which drive is through clutch drum 57, clutch 69 and shaft 79 to sun gears 110 and 102. Since forward drive clutch 58 is released, gear unit 13 has no reaction point and ring gear 103 rotates free. Carrier 112 is held by brake 115 and planet pinions 113 drive ring gear 111 and connected output shaft 109 in reverse.

TRANSMISSION CONTROL SYSTEM

Figure 2D:
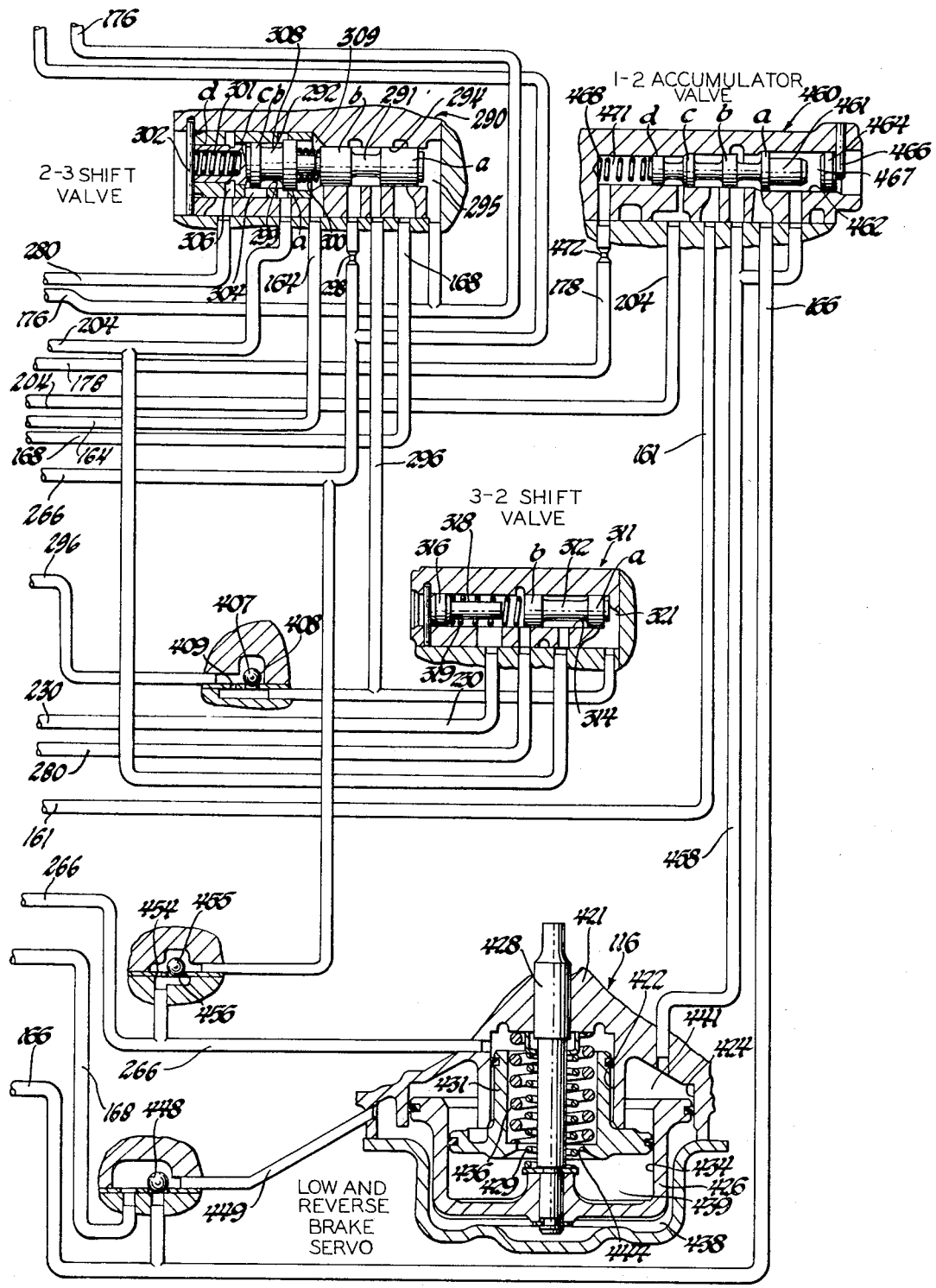

The present invention is embodied in the transmission control system shown in FIGS. 2a, 2b, 2c and 2d which is adapted to control transmission drive arrangements of the type shown in FIG. 2a and described above. Generally, the transmission control system is operable to establish the transmission in neutral and park conditions and to provide three selective forward drive range conditions providing different modes of operation and also to provide a reverse drive condition.

Pump

The fluid such as oil used in the control system is returned to a sump 120 shown in FIG. 2b via various exhausts in the system's components, the sump being secured to the underside of the transmission housing 14. Fluid pressure for the control system is supplied by the positive displacement pump 20 which is input driven as described above and is connected as shown in FIG. 2b to draw fluid from sump 120 through a suction passage 121 having a filter 122 therein. Fluid is delivered from pump 20 to a main passage 124 that is always connected to deliver fluid to a main pressure regulator valve 126 shown in FIG. 2b, a manual valve 128 shown in FIG. 2a, a vacuum modulator valve 130 shown in FIG. 2c, a detent control valve 132, and a detent solenoid valve 134 shown in FIG. 2c, and an overdrive brake accumulator 135 and overdrive governor pressure control valve 136 shown in FIG. 2b.

Main Pressure Regulator Valve

The main pressure regulator valve 126 regulates the pressure in main passage 124 and comprises a spool valve element 138 having spaced lands $a$, $b$ and $c$ of equal diameter located in bore 139 of the pump's body. Fluid from pump 20 is delivered via main passage 124 to valve element 138 always between lands $a$ and $b$ and then through a flow restrictive passage 140 to a chamber 141 which is formed by plugging the upper end of bore 139.

The lower end of valve element 138 contacts a spool member 142 having a land $a$ and a larger land $b$ located in an accommodating stepped bore 143 in a sleeved portion of the pump body. The lower end of bore 143 is closed to provide a chamber 144 to receive a pressure which normally varies as a function of engine intake manifold pressure and vehicle speed as described in more detail later. The space between lands $a$ and $b$ of spool member 142 is connected to receive the pressure providing for establishment of the transmission's reverse drive as described in more detail later with such pressure acting on the unbalanced area of land $b$ to urge the regulator valve element 138 upward.

The valve element 138 is normally biased to the position shown by a spring 145 and with pump pressure supplied to chamber 141, valve element 138 is urged downward by this pressure against the bias of spring 145 to regulate the pressure in main passage 124 at a value determined by the spring bias with the overage being exhausted first between lands *a* and *b* to a converter feed passage 146 and then between lands *b* and *c* to the pump intake passage 121 on continued downward valve element movement. The converter feed passage 146 is connected to deliver fluid to the torque converter 10 as shown in FIG. 2a with fluid from the converter being returned via a passage 148 to a transmission lubrication passage 149 through an oil cooler 150. An oil cooler bypass valve 152 is operable to at times bypass oil cooler 150, particularly when the oil is cold, by connecting converter return passage 148 to lubrication passage 149 ahead of cooler 150.

The above described main pressure regulation assumes that only spring bias is determining pressure. Considering now that pressure indicative of engine torque demand and vehicle speed acts in chamber 144 on land *a* of spool member 142, this member is urged upward and assists the spring 145 in controlling main pressure so that main pressure then increases with increase in this controlling pressure. In reverse, main pressure which is used to establish the reverse drive is supplied to spool member 142 between lands *a* and *b* where it acts on the unbalanced area of land *b* to assist spring 145 and thus boost main pressure to a high value.

Manual Valve

The manual valve 128 determines the operation of the control system and thus that of the transmission drive arrangement and comprises a spool valve element 158 having spaced lands *a*, *b*, *c*, *d* and *e* of equal diameter located in bore 159 of the valve body. The valve element 158 is movable to six positions which are park (P), reverse (R), neutral (N), drive range (D), intermediate range (INT) and low range (L). The valve element 158 is adapted at its left end to be operated through suitable conventional linkage including a pin 160 by the operator of the vehicle who manually selects the valve's position.

When the valve element 158 is in the D position as shown, main passage 124 is connected between lands *c* and *d* to a drive range passage 161 and also to a reverse-neutral-drive passage 162. The drive range passage 161 is connected via passage 68 to chambers 64 and 65 of the servo that operates the forward drive clutch 58 with the connection to chamber 64 being through a flow restriction 163. When valve element 158 is moved to the INT position, main passage 124 remains connected to drive range passage 161 and is in addition connected between lands *d* and *e* to an intermediate range passage 164 while land *c* blocks the main passage 124 from the reverse-neutral-drive passage 162, this latter passage being allowed to exhaust through port 169. When valve element 158 is moved to the L position, the main passage 124 remains connected to both the drive range passage 161 and the intermediate range passage 164, the latter connection now being provided between lands *c* and *d*, and the main passage 124 is in addition connected between lands *c* and *d* and then between lands *d* and *e* to a low range passage 166 while the reverse-neutral-drive passage 162 remains blocked from the main passage 124 by land *c*. When valve element 158 is moved to the N position, the main passage 124 is connected between lands *c* and *d* to the reverse-neutral-drive passage 162 and is blocked from all other passages leading from this valve. When valve element 158 is moved to the R position, the main passage 124 remains connected to the reverse-neutral-drive passage 162 and is in addition connected between lands *c* and *d* to a reverse drive passage 168 which is connected by passages 84 and 85 to chamber 76 of the servo that operates direct drive clutch 69. When valve element 158 is moved to the P position, the main passage 124 is blocked by land *e* so that main pressure is prevented from reaching any of the passages in the valve.

Two exhausts 169 and 170 are provided for the bore 159 as shown so that in the P position, the exhaust 169 is connected to only the reverse drive passage 168 and the reverse-neutral-drive passage 162 while the other exhaust 170 is connected to only the low range passage 166, intermediate range passage 164 and drive range passage 161. In the R position, the exhaust 169 is blocked by land *c* while exhaust 170 is connected to only the low range passage 166, intermediate range passage 164 and drive range passage 161. In the N position, the exhaust 169 is connected to the reverse drive passage 168 while exhaust 170 is connected to only the low range passage 166, intermediate range passage 164 and drive range passage 161. In the D position, the exhaust 169 is connected to only the reverse drive passage 168 while the exhaust 170 is connected to only the low range passage 166 and the intermediate range passage 164. In the INT position, the exhaust 169 is connected to only the reverse drive passage 168 and the reverse-neutral-drive passage 162 while the other exhaust 170 is connected to only the low range passage 166. In the L position, the exhaust 169 is connected to only the reverse drive passage 168 and the reverse-neutral-drive passage 162 while the other exhaust 170 is blocked from all the fluid passages by land *e*.

Governor Valve

A governor valve 171 as shown in FIG. 2a has a driven gear 172 arranged to mesh with a helical drive 174 formed on the transmission output shaft 109. The governor valve 171 is preferably of the type disclosed in U.S. Pat. No. 2,762,384 issued to M. S. Rosenberger. Valve 171 receives fluid from the drive range passage 161 and operates to provide in a governor line 176 a governor pressure which increases with increasing vehicle speed. For a more detailed description of the operation of the governor valve, reference may be made to the aforementioned Rosenberger patent.

Vacuum Modulator Valve

The vacuum modulator valve 130 translates load and torque demand from engine manifold vacuum, barometric pressure or altitude and speed or governor pressure into modulator pressure in a modulator passage 178.

The modulator valve 130 has a regulator spool valve element 179 having spaced lands *a*, *b* and *c* of equal diameter located in a bore 181 of the valve body and a land d of larger diameter located in an enlarged bore portion 182. The left end of bore 181 is closed to provide a chamber 184 which is connected through a flow restriction 186 to the modulator passage 178. The bore 182 to the right of land d is vented by an exhaust 188.

A conventional altitude compensating vacuum modulator 189 has a housing 191 which is fixed to the vacuum modulator valve body. A diaphragm 192 divides the housing into a vacuum chamber 194 and an atmospheric chamber 196, the vacuum chamber 194 being connected to the engine's intake manifold via an engine manifold vacuum passage 197 and the atmospheric chamber 196 being opened to atmosphere. A rigid U-shaped strut assembly 198 connects the diaphragm 192 to a sleeve member 199 which is arranged to engage the right-hand end 200 of the modulator valve element 179. An aneroid or evacuated closed bellows 201 is fixed at one end to the housing 191 and at the other end is fixed to the diaphragm 192 and strut assembly 198. The atmospheric pressure acting to collapse the bellows against the resilience thereof or a spring therein and a modifying or calibrating spring 202 provides a force acting through the strut to bias the valve element 179 to the left for increased modulator pressure in modulator passage 178. Increasing engine vacuum in chamber 194 and decreasing atmospheric pressure acting on bellows 201 reduces this force and thus the modulated pressure.

The vacuum modulator 189 applies through sleeve 199 a force to valve element 179 to tend to connect the main passage 124 between lands b and c to modulator passage 178 to increase modulator pressure while modulator pressure via flow restriction 186 acts in chamber 184 to bias the valve to tend to connect the modulator passage 178 between lands a and b to a normally exhausted detent passage 204 while land b blocks the modulator passage 178 from the main passage 124. Thus, the modulator pressure in modulator passage 178 increases with decreasing vacuum or increasing load torque demand but is decreased with increased altitude. The governor passage 176 is connected through a flow restriction 206 to deliver governor pressure to the space between lands c and d so it acts on the unbalanced area of land d to reduce modulator pressure with increasing transmission output speed and thus vehicle speed. In a full-throttle through-detent condition, the modulator force is sufficiently high enough to cause the valve element 179 to move rightward to connect the detent passage 204 to the modulator passage 178, the detent pressure in passage 204 which is equivalent to a fixed pressure as described in more detail later is delivered to modulator passage 178 so that the modulator pressure is either modulated or is at this fixed pressure, whichever is higher. A ball valve 209 shown in FIG. 2b is normally biased by modulator pressure to effect modulator pressure delivery to the main pressure regulator valve 126. Valve 209 is biased by the pressure of fluid supplied to intermediate range passage 164 to connect the intermediate range passage 164 via the modulator passage 178 to the main pressure regulator valve 126 to boost main pressure for intermediate and also low range operation while blocking intermediate range pressure from all other modulator pressure delivery.

Detent Control Valve and Detent Solenoid Valve

The detent control valve 132 and detent solenoid valve 134 control the pressure in the detent passage 204 to provide for detent or full throttle downshifts. The detent control valve 132 comprises a spool valve element 210 having spaced lands a and b of equal diameter located in a bore 211 of the valve body and a regulator valve element 214 having spaced lands a, b, c and d of equal diameter which are smaller in diameter than the lands of valve element 210 and are located in a smaller diameter bore portion 216 of the valve body. The right end of bore 211 is closed by a plug 217 to provide a chamber 218 which is connected to the main passage 124 through a flow restriction 219. The detent solenoid valve 134 is also connected to the main passage 124 through the flow restriction 219 and is in direct communication with chamber 218 of the detent control valve 132. The detent solenoid valve 134 has a valve member 220 which is normally spring biased to close an exhaust port 221 to thereby permit pressure to build in chamber 218 of the detent control valve to full main pressure. The detent solenoid valve 134 is operated by an accelerator pedal 224 that controls the engine throttle. When the accelerator pedal is moved to a detent position which occurs only after the engine carburetor throttle valve has been first fully opened to provide full engine power, it effects closure of a switch 225 to connect the vehicle's battery 226 via conductor line 228 to energize the detent solenoid valve 134 so that the valve element 220 is moved to open the exhaust port 221 to thus prevent pressure from building in chamber 218 of the detent control valve 132 by reason of the exhaust port 221 being larger than flow restriction 219. Thus, before the engine throttle reaches the detent position, the detent solenoid valve 134 remains closed so that pressure builds in chamber 218 of the detent control valve to hold the detent valve train against the bias of a spring 229 in the position shown which will be called the normal position. In the normal position the modulator passage 178 is connected between lands a and b of the detent valve element 210 to a shift modulator I passage 230 while the detent line 204 is connected between lands a and b of the regulator valve element 214 to the low range passage which it will be recalled is exhausted except in low range operation. On exhaust of chamber 218 by detent solenoid valve 134, the spring 229 moves the detent valve element 210 rightward against the plug 217 to a detent position in which the modulator passage 178 is disconnected from the shift modulator I passage 230. The drive range passage 161 is always open to the valve element 214 between lands b and c and this space is in turn connected through a flow restriction provided by a groove 231 cut in land c to the space between lands c and d of this valve element. The space between lands c and d is in turn connected via a chamber 232 to the detent passage 204. The pressure in chamber 232 acts on the end of land d against the bias of spring 229 to urge the regulator valve element 214 leftward to close off the connection of the drive range passage 161 to the detent passage 204 to thus provide for regulation of detent pressure in the detent passage 204. The chamber 232 is also connected to the shift modulator I passage 230 and thus the regulated detent pressure is established in both the detent passage 204 and the shift modulator I pressure passage 230. The left end of bore 216 is closed to provide a chamber 234 which is connected to the low range passage 166. Thus the valve train of the detent control valve 132 will be forced to the extreme right position in low range even though the accelerator pedal is at the detent position.

Overdrive Governor Pressure Control Valve And Overdrive Solenoid Valve

The overdrive governor pressure control valve 136 and an overdrive solenoid valve 236 provide manual control for the selection of the fourth forward drive which is overdrive. The overdrive governor pressure control valve 136 comprises a spool valve element 238 having spaced lands $a$ and $b$ of equal diameter located in a bore 239 of the valve body. Both ends of the bore 239 are closed to provide a chamber 241 which is connected to the reverse-neutral-drive passage 162 and a chamber 242 which is connected through a flow restriction 244 to the main passage 124. Chamber 242 is also connected to the overdrive solenoid valve 236 which has a valve element 246 that is normally spring biased to close an exhaust port 248 as shown to permit the pressure in chamber 242 to build to full main pressure. The overdrive solenoid valve 236 is energized by the vehicle operator closing a switch 249 so that power is transmitted to this drive by a conductor line 250 from the vehicle's storage battery 226. When the overdrive solenoid valve 236 is energized, the exhaust port 248 is opened to exhaust chamber 242 by reason of the exhaust port 248 being larger than the flow restriction 244.

Thus, when the switch 249 is opened so that the overdrive solenoid valve 236 is deenergized, the pressure in chamber 242 builds to full main pressure and this pressure bias in addition to the bias of a spring 252 moves the valve element 238 leftward to a governor pressure cutoff position in which the governor passage 176 is blocked by land $b$ from a 3-4 governor passage 254 which is then connected between lands $a$ and $b$ to an exhaust port 256. Alternatively, when the overdrive switch 249 is closed to energize the overdrive solenoid valve 236 to exhaust the chamber 242, and when the manual valve 128 is positioned in either reverse, neutral or drive range, the main pressure then present in the reverse-neutral-drive passage 162 and thus in the chamber 241 acts on the left end of land $a$ to move the valve element 238 to a governor pressure delivery position as shown in which the governor passage 176 is connected between lands $a$ and $b$ to the 3-4 governor passage 254 while the exhaust port 256 is blocked by land $a$. When the overdrive solenoid valve 236 remains deenergized and thus closed by the overdrive switch 249 remaining open so that full main pressure is in the chamber 242, subsequent delivery of full main pressure to chamber 241 is not effective to move this valve to condition the overdrive pressure control valve 136 in its governor pressure delivery position since the oppositely acting pressures are balanced with the result that the spring 252 alone maintains the cutoff position.

1-2 Shift Valve

A 1-2 shift valve 258 shown in FIG. 2a controls shifting between the first and second forward drives and comprises three spool valve elements; namely, a shift valve element 259, a detent valve element 260, and a regulator valve element 261. The shift valve element 259 has spaced lands $a$, $b$ and $c$ located in a bore 262 of the valve body, land $c$ being larger in diameter than the other lands. The right end of bore 262 is closed to provide a chamber 264 which is connected to the governor passage 176 so that governor pressure acts on the right end of land $a$ to tend to move shift valve element 259 in the leftward direction to an upshift position which is against the downshift biasing force transmitted by the 1-2 detent valve element 260.

In the first forward drive or downshift position as shown, the shift valve element 259 connects a 2-3 drive passage 266 between its lands $a$ and $b$ to an exhaust port 267 while the drive range passage 161 is blocked by land $b$ from the 2-3 drive passage 266. When the shift valve element 259 is moved leftward by governor pressure to an upshift or second forward drive position, land $a$ then blocks the exhaust port 267 while the drive range passage 161 is then connected between lands $a$ and $b$ to the 2-3 drive passage 266. Land $b$ has a slightly larger diameter than land $a$ and bore 262 is stepped accordingly to provide a hysteresis effect to hold shift valve element 259 in the upshift position to prevent valve hunting. The low range passage 166 is always connected to a chamber 269 between lands $b$ and $c$ of shift valve element 259. A chamber 270 between valve elements 259 and 260 is always connected to an exhaust port 272.

The detent valve element 260 and the regulator valve element 261 and a spring 274 arranged between and engaging these elements determine a downshift biasing force that is transmitted by the detent valve element to oppose the governor pressure force on the shift valve element 259. The detent valve element 260 has spaced lands $a$ and $b$ located in a bore 276, these lands being smaller in diameter than those of the shift valve element 259. The regulator valve element 261 has spaced lands $a$ and $b$ located in a bore 278 with the diameter of these lands being smaller than the land diameter of the detent valve element 260. In the 1-2 shift valve downshift position, a shift modulator II passage 280 is connected between lands $a$ and $b$ of detent valve element 260 to a passage 281 that has one branch blocked by land $a$ of the detent control valve element 260 and another branch which is connected to a chamber 282 at the left end of the regulater valve element 261. The shift modulator II passage 280 is connectible to the shift modulator I passage 230 to receive modulator pressure as described in more detail later. The modulator pressure in chamber 282 acts on land $b$ of valve element 261 to urge this valve element rightward against the bias of spring 274 to connect the chamber 282 past land $b$ to a passage 284 that is connected to chamber 286 between the regulator valve element 261 and the detent valve element 260 to thus provide in chamber 286 a pressure which is less than and proportional to modulator pressure. The pressure in chamber 286 acting on land $b$ of detent valve element 261 and the bias of spring 274 provide a force resisting upshift movement of the 1-2 shift valve element 259. When the governor pressure acting in chamber 264 is sufficient to move the 1-2 shift valve train leftward to the upshift position, the shift modulator II passage 280 is blocked by land a of the detent valve element 260 and the detent passage 204 is connected between lands a and b of the regulator valve element to the passage 284 and thus to the chamber 286 to apply detent pressure to land b of the detent valve element 260 to urge downshifting of the 1-2 shift valve.

2-3 Shift Valve

A 2-3 shift valve 290 shown in FIG. 2d controls shifting between the second and third forward drives and comprises a shift valve element 291 and a modulator valve element 292. The shift valve element 291 has spaced lands a and b located in a bore 294 of the valve body. The right end of bore 294 is closed to provide a chamber 295 which is connected to the governor passage 176 so that governor pressure acts on the right end of land a to tend to move the valve element 291 leftward from a downshift position to an upshift position.

In the downshift position, the shift valve element 291 connects the reverse drive passage 168 between lands a and b to a direct drive clutch passage 296 while land b blocks the 2-3 drive passage 266 downstream of a flow restriction 298. When the shift valve element 291 is moved by governor pressure to the upshift position, land a blocks the reverse drive passage 168 while the 2-3 drive passage 266 is then connected through flow restriction 298 and between lands a and b to the direct drive clutch passage 296. Land b has a slightly larger diameter than land a and bore 294 is stepped accordingly to provide a hysteresis effect to hold shift valve element 291 in the upshift position to prevent valve hunting.

The modulator valve element 292 transmits a downshift biasing force to the shift valve element 291 opposing the upshift governor bias and has lands a, b, c and d of progressively smaller diameter located in a bore 299 which is stepped accordingly. A spring 300 is arranged to bias the valve elements 291 and 292 apart while a spring 301 having a larger spring force and seated on a pin 302 acts on the modulator valve element 292 to urge the shift valve element 291 to its downshift position. In the downshift position, the shift modulator II passage 280 is connected past land c to a chamber 304 where it acts on the unbalanced area of land b to thus provide a modulator pressure bias in addition to the bias of spring 301 to hold the shift valve element in its downshift position. When the valve train is moved by governor pressure to the upshift position, chamber 304 is blocked by land c from the shift modulator II passage 280 which is then connected to a chamber 306 where it acts on the unbalanced area of land c to provide a lower modulator pressure bias urging downshifting. The detent passage 204 is always connected to a chamber 308 so that when detent pressure is made available to the detent passage 204, this pressure acts on the unbalanced area of land a to urge the shift valve element 291 to the downshift position. The intermediate range passage 164 is connected to a chamber 309 so that when intermediate range pressure is made available, this pressure acts on the left end of the shift valve element 291 to hold the shift valve element in its downshift position.

3-2 Shift Valve

A 3-2 shift valve 311 shown in FIG. 2d controls delivery of modulator pressure to the 2-3 shift valve 290 to control downshifting from third to second forward drive. The 3-2 shift valve 311 comprises a shift valve element 312 having spaced lands a and b located in a bore 314 of the valve body. The left end of bore 314 is closed by a plug 316 to provide a chamber 318 in which is located a spring 319 that urges valve element 312 to a modulator pressure delivery position as shown in which there is provided open connection of the shift modulator I passage 230 via chamber 318 and past the end of land b to the shift modulator II passage 280 and thus to the 2-3 shift valve 290. The right end of bore 314 is closed to provide a chamber 321 to which the direct drive clutch passage 296 is connected so that when this passage receives fluid pressure to establish the third forward drive as described in more detail later, this pressure acting in chamber 321 on the end of land a acts to urge element 312 leftward to a detent pressure delivery position in which the detent passage 194 is connected between lands a and b to the shift modulator II passage 280 while this latter passage is blocked by land b from the shift modulator I passage 230. Thus detent pressure may then act on the 2-3 shift valve 290 where before modulator pressure acted to provide downshift bias thereon. When detent pressure is supplied to the shift modulator I passage 230, this pressure plus the bias of spring 319 is effective to hold the valve element 312 in the modulator pressure delivery position shown against any clutch pressure acting in chamber 321 for reasons which will become more apparent later.

3-4 Shift Valve

A 3-4 shift valve 324 shown in FIG. 2b controls shifting between the third and fourth drives and comprises a shift valve element 326 and a modulator valve element 327. The shift valve element 326 has spaced lands a, b and c located in a bore 328 of the valve body. When the shift valve element 326 is in the downshift position as shown, the drive range passage 161 downstream of a flow restriction 330 is blocked by land b while an overdrive brake passage 331 is connected between lands a and b and then through a flow restriction 332 to an exhaust port 334 and a lockout clutch passage 336 is blocked at bore 328 between lands b and c. Overdrive brake passage 331 is connected to chamber 53 of the servo that operates the overdrive brake 48 and lockout clutch passage 336 is connected via passages 46 and 47 to chamber 43 of the servo that operates the lockout clutch 41. The right end of bore 328 is closed to provide a chamber 338 which is connected to the 3-4 governor passage 254. When the governor pressure delivered to chamber 338 to act on the right end of land a is sufficient to move shift valve element 326 leftward to an upshift position against the downshift biasing force as described in more detail later, the drive range passage 161 is then connected between lands a and b to the overdrive brake passage 331 while the lockout clutch passage 336 is connected between lands b and c and then through a flow restriction 339 to an exhaust port 340 and the exhaust port 334 is blocked by land a. Land b has a slightly larger diameter than land *a* and bore 328 is stepped accordingly to provide a hysteresis effect to hold shift valve element 326 in the upshift position to prevent valve hunting.

The modulator valve element 327 transmits a downshift biasing force to the shift valve element 326 and has lands *a* and *b* of equal diameter and lands *c* and *d* of different and smaller diameters located in a bore 342 which is stepped accordingly. A spring 344 seated on pin 346 urges the modulator valve element 327 rightward to normally yieldingly hold the shift valve element 326 in its downshift position. In the downshift position, the modulator passage 178 is connected past land *d* to a chamber 348 where it acts on the unbalanced area of land *b* to provide a modulator downshift bias resisting the governor upshift bias on the shift valve element 326. When the shift valve element 326 is in its upshift position, the modulator passage 178 is blocked from the chamber 348 so that modulator pressure then acts on the unbalanced area of land *c* to urge downshifting. The detent passage 204 is blocked at the valve bore 342 between lands *a* and *b* when the valve train is downshifted so that detent pressure provides no pressure bias in that condition and in the upshifted position, is connected past land *b* to the chamber 348 where it then acts on the unbalanced area of land *b* to urge downshifting of shift valve element 326. An exhaust port 349 is connected to exhaust any leakage to the space between shift valve element 326 and modulator valve element 327.

Overdrive Brake Accumulator

The overdrive brake accumulator 135 shown in FIG. 2b provides for cushioning the engagement of lockout clutch 41 and comprises a housing 351 having a bore 352 in which is mounted a piston 354 which slides on a pin 356 that is secured at its lower end to the housing. The piston 354 divides the interior of the housing into chambers 358 and 359. A spring 361 biases the piston 354 to the position shown to block the main passage 124 from the lockout clutch passage 336, the overdrive brake passage 331 being connected to the other chamber 359. A ball valve 364 in the main passage 124 operates to close a flow restrictive port 368 so that a smaller flow restrictive port 369 delivers fluid at a slow rate to the overdrive brake accumulator and opens to permit fast flow through port 368 in the opposite direction. When fluid is supplied through the flow restrictive port 369 to chamber 358 at the slow rate, the piston 354 is stroked downward against the bias of spring 361 and effects connection of the main passage 124 to the lockout clutch passage 336 to provide smooth engagement of the lockout clutch 41 under the control of the flow restriction 369 and the bias of spring 361. Then, when the overdrive brake 48 is engaged by supply of fluid pressure to the overdrive brake passage 331, this pressure is delivered to chamber 359 where it assists spring 361 in stroking the piston 354 back to the position shown with the fluid exiting from chamber 358 at a fast flow rate by the ball valve 364 opening to permit flow through the large flow restriction 368 to rapidly release lockout clutch 41.

Overrun Brake Servo

The overrun brake servo 87 shown in FIG. 2c operates the overrun band brake 86 and also provides multiple accumulator action to cushion both a 2-3 upshift and a 3-2 downshift. The overrun brake servo 87 comprises a housing 371 having a bore 372 in which is mounted two pistons 374 and 376. The piston 374 is mounted on pin 378 which is slideably mounted in the housing and is operatively connected to the band brake 86 by any suitable conventional mechanical linkage, not shown. The other piston 376 is mounted to slide on a pin 379 which is fixed at its lower end to the housing 371. The piston 374 separates a chamber 381 at the closed upper end of the bore 372 from a chamber 384 intermediate the piston 374 and the other piston 376. The piston 376 separates chamber 384 from a chamber 386 provided at the closed lower end of bore 372. A spring 388 located in chamber 381 is seated upon a spring seat 389 carried by pin 378 and biases piston 374 toward a release position disengaging the band brake 86. Piston 374 is arranged to contact a snap ring 390 on pin 378 to move the pin upwardly toward an engage position to engage band brake 86. The other piston 376 is normally biased to the position shown by a spring 391 located in the lower chamber 386. The reverse-neutral-drive passage 162 is connected to chamber 381, the 2-3 drive passage 266 is connected to chamber 384 and the direct drive clutch passage 296 is connected to chamber 386. In the reverse-neutral-drive passage 162 leading to chamber 381 there is provided a ball valve 396 which is operable to close and open a flow restriction 397. When flow is directed toward chamber 381 of the overrun brake servo, ball valve 396 closes flow restriction 397 so that the fluid is required to flow through a smaller flow restriction 398 and thus at a slow rate. When flow is in the opposite direction, the ball valve 396 unseats to open the flow restriction 397 so that the flow in the opposite direction is at a faster rate. In the 2-3 drive passage 266 leading to chamber 384, there is provided a ball valve 400 which is operable to close and open a flow restriction 401. When flow is directed toward chamber 384 the ball valve 400 closes flow restriction 401 so that the fluid is required to flow through a smaller flow restriction 402 and thus at a slow rate. When flow is from chamber 384 the ball 400 opens the flow restriction 401 so that return flow occurs at a faster rate. In the direct drive clutch passage 296 leading to both the chamber 75 of the direct drive clutch 69 and chamber 386 of the overrun brake servo 87 there is provided a ball valve 407 which is operable to open and close a flow restriction 408. When flow is from the 2-3 shift valve 290 toward these devices, the ball valve 407 unseats so that flow is through flow restriction 408 at a fast rate. When flow is in the opposite direction the ball valve 407 closes flow restriction 408 so that the return flow is through a smaller flow restriction 409 and thus at a slower rate.

Low and Reverse Brake Servo

The low and reverse brake servo 116 shown in FIG. 2d for engaging the low and reverse band brake 115 comprises a housing 421 having concentric bores 422 and 424. A servo piston 426 is reciprocally mounted in bore 424 and is fixed to an actuator stem 428 which is operatively connected to operate the band brake 115 by conventional mechanical linkage, not shown, there being provided a spring 429 that biases piston 426 to its band release position. An accumulator piston 431 has one land mounted in bore 422 and a larger diameter land mounted in a bore 434 provided in the interior of piston 426, there being provided a spring 436 that biases the piston 431 downward to contact the apply piston 426. By this piston arrangement there is provided a chamber 438 below the piston 426, a chamber 439 between the pistons 426 and 431, and a chamber 441 above the large diameter portions of pistons 431 and 426. The reverse drive passage 168 and the low drive passage 166 are connected alternatively by a ball valve 448 to a reverse-low passage 449 which is connected to chamber 438 of the low and reverse brake servo 116. When pressure is supplied to the reverse drive passage 168, this pressure operates ball valve 448 to prevent fluid in the reverse drive passage 168 from reaching the low drive passage 166 while the reverse drive passage is connected to the reverse-low passage 449. Alternatively, when the low drive passage 166 is receiving fluid pressure, this pressure operates on the ball valve 448 to prevent the fluid from reaching the reverse drive passage 168 while being delivered to the reverse-low passage 449. On fluid pressure delivery to chamber 438, the piston 426 is moved upward against the bias of springs 429 and 436 to engage the band brake 115. The 2-3 drive passage 266 is connected to deliver fluid to chamber 439 of the low and reverse brake servo 116 and also to chamber 91 of the second gear brake 96 through a flow restriction 454 which determines a slow flow rate. During such flow, a ball valve 455 closes a larger flow restriction 456. When flow is in the opposite direction, the ball 455 unseats to open flow restriction 456 so that there is faster fluid flow in the opposite direction. The remaining chamber 441 is connected to a 1-2 accumulator passage 458 which is supplied with fluid pressure as will now be described.

1-2 Accumulator Valve

A 1-2 accumulator valve 460 shown in FIG. 2d provides a variable accumulator pressure to cushion the engagement of the second gear brake 96 and comprises a regulator valve element 461 having spaced lands $a, b, c$ and $d$ located in a bore 462. Lands $b$ and $c$ are of equal diameter, land $a$ is of larger diameter, and land $d$ is of smaller diameter and the bore 462 is stepped accordingly. A plug 464 is held in place by a pin 466 to close the right end of bore 462 to provide a chamber 467. A regulator spring 468 biases the valve element 461 rightward to connect the drive range passage 161 to the 1-2 accumulator passage 458 while closing the latter passage from the low drive range passage 166. The 1-2 accumulator passage 458 is connected to chamber 467 so that pressure in this passage acts on the full end area of land $a$ to urge the valve element leftward against the bias of spring 468. The left end of bore 462 is closed to provide a chamber 471 which is connected to the modulator passage 178 through a flow restriction 472 so that modulator pressure provides a variable bias supplementing the bias of the spring 468 to provide the accumulator pressure in passage 458 with a value that increases with increasing modulator pressure. The low range passage 166 is always connected to deliver fluid pressure to act on the unbalanced area of land $a$ to hold the accumulator valve in its extreme righthand position in which the drive range passage 161 is fully open to the 1-2 accumulator passage 458. The detent passage 204 is always connected to deliver any fluid pressure therein to act on the unbalanced area of land $c$ to provide an additional rightward pressure bias to increase the accumulator pressure.

CONTROL SYSTEM OPERATION

Neutral

With the engine running at idle and the manual valve 128 in its N position for neutral operation, fluid from pump 20 is delivered to main passage 124 which directs the fluid to the main pressure regulator valve 126, the manual valve 128, the vacuum modulator valve 130, the detent control valve 132, the detent solenoid valve 134, the overdrive governor pressure control valve 136, and the overdrive brake accumulator 135. The main pressure regulator valve 126 regulates the pressure in the main passage 124 at a predetermined value and when the pump output exceeds the demand of this pressure, the pressure regulator valve opens to direct fluid via converter feed passage 146 to fill the converter 10. When the converter is filled, fluid returning from the converter via the converter return passage 148 is directed through the cooler 150 and then via the lubrication feed passage 149 to the transmission's lubrication system, the bypass valve 152 operating to open to bypass fluid around the cooler from the converter return line 148 directly to the lubrication feed passage 149 on the occurrence of sufficient back pressure immediately upstream of the cooler. As main pressure continues to increase, the main pressure regulator valve 126 opens further to direct the excess fluid via passage 121 to the suction side of the pump 20. The manual valve 128 directs main line pressure to the reverse-neutral-drive passage 162 which in turn directs this pressure to the overrun brake servo 87 and the overdrive governor pressure control valve 136.

The vacuum modulator valve 130 operates on the main pressure to provide modulator pressure in the modulator passage 178 which directs the latter pressure to the main pressure regulator valve 126 to provide modulation of the main pressure in accordance with engine torque demand, vehicle speed and altitude. The modulator pressure is also directed to the 1-2 accumulator valve 460, the detent control valve 132, and the 3-4 shift valve 324. The only pressure bias on the detent control valve 132 is that of main pressure and thus the detent control valve is moved to its normal position to direct the modulator pressure via the shift modulator I passage 230 to the 3-2 shift valve 311. The 3-2 shift valve 311 directs the modulator pressure to the shift modulator II passage 280 which in turn directs this pressure to both the 2-3 shift valve 290 and the 1-2 shift valve 258. At the overrun brake servo 87, the main pressure in chamber 381 acts to assist spring 388 in holding the piston 374 in its release position to thus maintain disengagement of the overrun band brake 86. At the overdrive governor pressure control valve 136 with main pressure thus acting on the opposite ends of the valve element 238, the spring 252 operates to hold this valve element in its governor pressure cutoff position so that governor pressure is not made available to chamber 338 of the 3-4 shift valve 324, this chamber instead being exhausted.

The main pressure feed to the overrun drive brake accumulator 135 is forced to pass through the flow restriction 369, the ball valve 364 operating to close the larger flow restriction 368, and this restricted flow is directed to chamber 358 where it operates to stroke piston 354 downward against the spring 361, the chamber 359 being exhausted, whereupon fluid is then directed from chamber 358 to the lockout clutch passage 336 which in turn directs the pressure to chamber 43 to engage the lockout clutch 41. Thus, all of the shift valves are in their downshift position and with the forward drive clutch 58 released, no torque can be transmitted through the gearing irrespective of the fact that the overdrive unit lockout clutch 41 is engaged.

Drive Range - First Gear Drive

Then when the manual valve 128 is moved to the D position to provide drive range operation, main pressure is directed to the drive range passage 161 to feed the drive range circuit while main pressure remains available to the circuit previously described by supply of fluid by the reverse-neutral-drive passage 162. Thus, the overdrive unit lockout clutch 41 remains engaged while the drive range circuit is conditioned to effect transmission drive through the gearing. The drive range passage 161 directs main pressure to chambers 64 and 65 to engage the forward drive clutch 58 with the outer chamber 64 being fed through the flow restriction 163 to provide smooth shifting from neutral to drive and also from park and reverse to drive. The drive range passage 161 also directs main pressure to the governor valve 171 to establish governor pressure in the governor passage 176. This governor pressure which increases with increasing vehicle speed is directed to act on the 1-2 shift valve 258, 2-3 shift valve 290, vacuum modulator valve 130 and overdrive governor pressure control valve 136. The governor pressure directed to the modulator valve reduces modulator pressure with increases in vehicle speed so that main pressure is regulated to vary with torque input to the transmission for smooth shifts with sufficient capacity for both heavy and light acceleration. Main pressure is also directed by the drive range passage 161 to the 1-2 shift valve 258, the detent control valve 132, the 3-4 shift valve 324 and the 1-2 accumulator valve 460. The main pressure in the drive range passage 161 is blocked at the 1-2 shift valve 258, the detent control valve 132 and the 3-4 shift valve 324 but at the 1-2 accumulator valve 460 the bias provided by modulator pressure acts to establish 1-2 accumulator pressure in the 1-2 accumulator passage 458, this accumulator pressure being derived from the pressure in the drive range passage 161. The 1-2 accumulator pressure which increases with increasing modulator pressure is directed to chamber 441 of the low and reverse brake servo 116 where it acts on the accumulator piston 431 to move it downward to the ready position.

With both the overdrive unit lockout clutch 41 and the forward drive clutch 58 engaged, the transmission is conditioned in first gear and the vehicle may be accelerated by advancing the engine throttle.

Drive Range - Second Gear Drive

As the vehicle is accelerated, governor pressure in chamber 264 of the 1-2 shift valve 258 biases this valve towards its upshift position. Modulator pressure from the modulator passage 178 is delivered by the detent control valve 132 to the shift modulator I passage 230 which in turn directs this pressure to the 3-2 shift valve 311. The 3-2 shift valve 311 directs the modulator pressure to the shift modulator II passage 280 which in turn directs the fluid to the 1-2 detent valve element 260 of the 1-2 shift valve 258. The 1-2 detent valve directs the fluid thus received via passage 281 to chamber 282 where it acts rightward on the 1-2 regulator valve element 261 against the bias of spring 274. The regulator valve element 261 moves rightward and admits pressure via passage 284 to the chamber 286 where the pressure therein which is thus regulated at a value less than and proportional to modulator pressure, acts to bias the 1-2 shift valve element 259 towards its downshift position. At some vehicle speed, the governor pressure bias will overcome the modulator pressure bias to move the 1-2 shift valve element 259 to its upshift position to deliver main pressure from the drive range passage 161 to the 2-3 drive passage 266. Fluid is directed by the 2-3 drive passage 266 through the flow restriction 454 to chamber 91 at a slow rate to engage the second gear brake 96, the ball valve 455 closing during flow in this direction. The fluid passing through flow restriction 454 is also directed to chamber 439 of the low and reverse brake servo 116 where it acts on the 1-2 accumulator piston 431 to stroke this piston upward against both the bias of spring 436 and the pressure bias provided by the 1-2 accumulator pressure present in chamber 441 as described previously, this 1-2 accumulator pressure which also may be described as trim pressure, being a regulated pressure and increasing with increasing modulator pressure and thus torque demand. During such stroking of the 1-2 accumulator piston 431, there is thus absorbed some of the fluid flow being used to apply the second gear brake 96 so that this brake is applied at a controlled rate dependent on the value of the 1-2 accumulator pressure. This provides for smooth engagement of the second gear brake 96 with the brake engagement occurring more rapidly at heavy torque demand than at light torque demand. In addition, the 2-3 drive passage 266 is also connected through the flow restriction 402 to chamber 384 of the overrun brake servo 87 where such pressure acts to stroke the 2-3 accumulator piston 376 downward against the bias of spring 391. This stroking of the 2-3 accumulator piston 376 absorbs additional fluid from the overrun band brake feed to further cushion engagement of the second gear brake 96. At the overrun brake servo 87, the main pressure acting in chamber 384 is not effective to stroke the overrun brake piston 374 since this pressure is balanced by the main pressure present in the chamber 381 to permit the spring 388 to hold the piston 374 in its brake release position irrespective of the pressure present in chamber 384.

With both the overdrive unit lockout clutch 41 and forward drive clutch 58 thus remaining engaged, and the second gear brake 96 now engaged, the transmission is thus conditioned for second gear drive. At the 1-2 shift valve 258 on the upshift to second gear, the shift modulator II passage 280 is blocked and the passage 281 downstream thereof is connected past land *a* of the 1-2 detent valve element 260 to exhaust 272 so that only spring 274 tends to bias the 1-2 shift valve to its downshift position. Thus a downshift from second to first gear will occur at a vehicle speed lower than that at which the shift from the first to second gear occurred as will be described in more detail later.

Drive Range - Third Gear Drive

When operating in second gear drive, the modulator pressure in the shift modulator II passage 280 delivered to chamber 306 of the 2-3 shift valve 290 acts to bias this shift valve in its downshift position. With continuing vehicle acceleration and at some vehicle speed, governor pressure acting in chamber 295 on the 2-3 shift valve element 291 will bias this valve element against the modulator bias to its upshift position to then admit main pressure from the 2-3 drive passage 266 through flow restriction 298 to the direct drive clutch passage 296. Pressure in the direct drive clutch passage 296 is directed to chamber 321 of the 3-2 shift valve 311 and depending upon the value of modulator pressure in passage 230 acting on land $b$ will position the valve element 312 to connect the shift modulator II passage 280 to the detent passage 204. With the detent control valve 132 in its non detent position, the detent passage 204 is connected to the low drive range passage 166 which is exhausted at the manual valve 128 and thus the shift modulator II passage 280 is exhausted of modulator pressure. Thus at light throttle, light torque demand operation the shift modulator II passage 280 is exhausted. At heavy throttle conditions, the 3-2 shift valve 311 may admit modulator pressure from the shift modulator I passage 230 to the shift modulator II passage 280, but in third gear drive, this modulator pressure is effective only upon small land $c$ of the 2-3 modulator valve element 292 rather than the larger land $b$ to prevent undesirable hunting of the 2-3 shift valve.

The main pressure delivered to the direct drive clutch passage 296 opens the ball valve 407 so that fluid flows through flow restriction 408 at a fast rate to chamber 75 of direct drive clutch 69 to commence engagement of this clutch. Fluid is also delivered via flow restriction 408 to chamber 386 of the overrun brake servo 87 where it, with the assistance of spring 391, strokes the 2-3 accumulator piston 376 upward against the main pressure in chamber 384 and as a result provides for smooth engagement of the direct drive clutch 69. With clutches 41, 58 and brake 96 remaining engaged and now with the added engagement of clutch 69, the transmission is conditioned for direct drive.

Drive Range - Overdrive or Fourth Gear Drive

When operating in direct or third gear drive, overdrive may be manually selected by the vehicle operator, provided vehicle speed is above a predetermined minimum, by closing switch 249. The valve element 246 then opens the exhaust port 248 to drop the pressure in chamber 242 of the overdrive governor pressure control valve 136 downstream of the flow restriction 244, this latter flow restriction thus preventing loss of main pressure from the main passage 124. The main pressure in chamber 241 is then effective to move valve element 238 to the connect or governor pressure delivery position shown to admit governor pressure in governor passage 176 to the 3-4 governor passage 254 and thus to chamber 338 of the 3-4 shift valve 324. With the 3-4 shift valve 324 in its downshift position, modulator pressure acts on land $b$ of the 3-4 modulator valve element 327 to yieldingly hold the 3-4 shift valve 324 in its downshift position. At some vehicle speed, dependent upon modulator pressure and the bias of spring 344, the 3-4 shift valve 324 will upshift to its overdrive position. Due to the force of spring 344, governor pressure will not upshift the 3-4 shift valve 324 until a predetermined vehicle speed is reached. Thus, at light throttle, minimum torque demand, a minimum vehicle speed is required for upshifting to overdrive even though overdrive may be demanded by the operator closing switch 249.

With the 3-4 shift valve 324 upshifted, modulator pressure is effective only on the small land $c$ of the 3-4 modulator valve element 327 to prevent hunting between overdrive and direct drive. The 3-4 shift valve 324 then directs fluid from the drive range passage 161 through flow restriction 330 to the overdrive brake passage 331 while connecting the lockout clutch passage 336 to exhaust port 340 through flow restriction 339. The fluid in the overdrive brake passage 331 is directed to chamber 53 to apply the overdrive brake 48 and is also admitted to chamber 359 of the overdrive brake accumulator 135. The pressure thus admitted to chamber 359 together with the bias provided by spring 361 urges the piston 354 upward against main pressure to discharge fluid in chamber 358 into the overdrive clutch passage 331. The stroking of piston 354 and the flow restriction 339 at the 3-4 shift valve 324 cooperate to control the rate of release of the lockout clutch 41 and the rate of application of the overdrive brake 48 to provide a smooth shift transition. Upon completion of the establishment of overdrive, the piston 354 acts as a valve to prevent main pressure in the main passage 124 from reaching the lockout clutch passage 336. The main pressure is constantly available from the main passage 124 through flow restriction 369 to the overdrive brake accumulator 135 and thus the valve action of the piston 354 operates to prevent pressure loss while operating in overdrive.

Drive Range - Downshifting

In overdrive, a normal closed or light throttle downshift, a heavy throttle downshift and a detent or past full throttle downshift from overdrive to direct drive may occur. A light throttle downshift will occur at a substantially lower vehicle speed than the vehicle speed at which an upshift occurs since modulator pressure acts on small land $c$ rather than the larger land $b$ of the 3-4 modulator valve element 327. Within a certain higher vehicle speed range, a heavy throttle forced downshift from overdrive to direct drive may occur due to the effect of modulator pressure on land $c$ since the modulator pressure is controlled by torque demand and vehicle speed. A detent downshift may occur in a still higher speed range by closing the detent switch 225 upon movement of the accelerator pedal 224 past full open throttle position. Detent control valve 132 then operates to provide a regulated detent pressure in the detent passage 204 which is transmitted to act on land $a$ of the 3-4 modulator valve element 327 to bias the 3-4 shift valve 324 to its downshift position. Detent pressure is also directed to the vacuum modulator valve 130 so that modulator pressure is equal to or greater than detent pressure and acts upon the smaller land c of modulator valve element 327 to aid in biasing the 3-4 shift valve to its downshift position. It will further be apparent that a downshift from overdrive to direct drive may be had at any time by opening switch 249 to exhaust governor pressure from chamber 338 of the 3-4 shift valve 324.

Upon a downshift from overdrive to direct drive, the overdrive brake passage 331 is exhausted through flow restriction 332 to the exhaust port 334 and the lockout clutch passage 336 is blocked from exhaust port 340 by land c to prevent exhaust of this passage by the 3-4 shift valve 324. With exhaust of the overdrive brake passage 331, the overdrive accumulator piston 354 is stroked by main pressure against the bias of spring 361 to force fluid in the accumulator chamber 359 through flow restriction 332 to the exhaust port 334 of the 3-4 shift valve 324. Thus, the stroking of the piston 354 and the flow restriction 332 cooperate to provide smooth engagement of the lockout clutch 41 and release of the overdrive brake 48 such that the downshift is accomplished smoothly from overdrive to direct drive.

With the transmission in third gear or direct drive, the 3-2 shift valve 311 normally connects the shift modulator II passage 280 to the detent passage 204 which is exhausted by the manual valve 128. Thus, normally no modulator pressure acts on the 2-3 shift valve 290 so that a relatively low speed is required for a downshift to second gear drive. Within a certain vehicle speed range, at heavy throttle operation, modulator pressure plus the bias of spring 319 exceed the main pressure bias provided by the pressure acting in chamber 321 to position the valve element 312 to admit modulator pressure from shift modulator I passage 230 to the shift modulator II passage 280. At certain vehicle speeds, the modulator thus provided to act on land c of the 2-3 modulator valve element 292 will then position the 2-3 shift valve 290 in its downshift position to connect the direct drive clutch passage 296 to the reverse passage 168 which is then exhausted by the manual valve 128. During the downshift from direct to the second gear drive, the ball valve 407 closes flow restriction 408 so that the discharge of fluid from the clutch chamber 75 is through the flow restriction 409 at a slow rate. At the overrun brake servo 87 the accumulator piston 376 strokes against the spring 391 and cooperates with flow restriction 409 to delay the drop of pressure in chamber 75 so that the direct drive clutch 69 is gradually released. This permits engagement of the one-way brake 100 without shock.

In a higher vehicle speed range, a detent of past full throttle downshift from third to second gear drive may be had by closing switch 225. The detent control valve 132 is then forced to move to its detent position to establish detent pressure in the detent passage 204 wherein the modulator pressure in the shift modulator I passage 230 then becomes detent pressure in shift modulator II passage 280 irrespective of the position of the 3-2 shift valve 311. This detent pressure acting upon land c of the 2-3 modulator valve element 292 plus detent pressure from the detent passage 204 acting upon land b of this same valve element will position the 2-3 shift valve 290 in its downshift position at higher vehicle speeds than those required for a heavy throttle forced downshift below full engine throttle.

When operating in second gear drive, a light throttle downshift from second to first gear drive will occur at relatively low vehicle speeds. In second gear drive, the shift modulator II passage 280 is blocked by land a of the 1-2 detent valve element 260 while the passage 281 is connected to the exhaust port 272 and thus there is no modulator pressure effective on the valve for downshift purposes. A past full throttle detent downshift may be had by closing switch 225 whereupon detent control valve 132 then delivers detent pressure to the detent passage 204 and thus to chamber 286 of the 1-2 shift valve 258. This detent pressure in chamber 286 plus the bias of spring 274 moves the 1-2 shift valve to its downshift position. With the 1-2 shift valve in its downshift position, modulator pressure is then admitted to act on the end of land b of the regulator valve element 261 to maintain the 1-2 shift valve in its downshift position. Upon a shift from second to first gear drive, the 2-3 drive passage 266 is connected to the exhaust port 267 by the 1-2 shift valve 258 and the ball valve 455 opens flow restriction 456 to permit rapid exhaust from chamber 91 to rapidly release the second gear brake 96.

Intermediate Range

When the manual valve 128 is moved to the INT position to provide for intermediate range operation, transmission operation is limited to providing first and second gear drive and also provides overrun braking in the second gear drive.

In intermediate range, the overdrive unit clutch 41 and the forward drive clutch 58 are applied in the same manner as described above in drive range first gear. Main pressure is now delivered by the manual valve 128 to the intermediate range passage 164 which directs such pressure to chamber 309 of the 2-3 shift valve 290 where it acts on land b of the 2-3 shift valve element 291 to assist spring 300 in maintaining the 2-3 shift valve in its downshift or second gear position. The main pressure in intermediate range passage 164 is also delivered by ball valve 209 to the main pressure regulator valve 126 to boost main pressure.

With no other change in transmission control conditions, the 1-2 shift valve 258 will thus upshift from first to second gear drive in the manner heretofore described upon increase in vehicle speed. However, in intermediate range operation, the overrun brake piston 374 will move in response to pressure in the chamber 384 supplied by the 2-3 drive range passage 266 to apply the overrun brake 86 for the establishment of the second gear drive since chamber 381 is now exhausted by the manual valve 128. During this engagement of the overrun brake, the 2-3 accumulator piston 376 will stroke against the spring 391 to cushion the application of the overrun brake band by regulating the rate of pressure rise in chamber 384 during the stroking of the piston 374.

In second gear in intermediate range operation, the main pressure acting on the 2-3 shift valve 290 prevents an upshift to third gear drive. Intermediate range operation is particularly useful for engine braking purposes in descending long or steep grades, or in preventing hunting between second and third gear drive when ascending a grade in a speed range wherein such hunting might otherwise occur.

Low Range Operation

Manual valve 128 is moved to its L position to establish low range transmission operation in which overrun braking is provided in first gear drive. With the manual valve in its low range position, main pressure is maintained in the intermediate range passage 164 and is also admitted to the low range passage 166 which directs it to chamber 269 of the 1-2 shift valve 258, to chamber 234 of detent control valve 132, to the 1-2 accumulator valve 460 between lands $a$ and $b$ of valve element 461 and by ball valve 448 to chamber 438 of the low and reverse brake servo 116.

In low range operation, main pressure is thus admitted by detent control valve 132 to the detent passage 204 and modulator pressure is regulated at main pressure. Main pressure from the detent passage 204 is transmitted between lands $a$ and $b$ of the 1-2 regulator valve element 261 to chamber 286 to bias the 1-2 shift valve 258 to maintain the downshift position. In addition, main pressure from the low range passage 166 acting on unbalanced land $d$ of the 1-2 shift valve element 259 acts to trim the downshift forces on the 1-2 shift valve. Thus the transmission will remain in first gear until a much higher vehicle speed than that at which an upshift occurs when operating in drive range.

The main pressure delivered from the low range passage 166 to the 1-2 accumulator valve 460 acts upon the unbalanced area of land $a$ to bias the valve element 461 rightward so that main pressure is delivered to the 1-2 accumulator passage 458 and thus to chamber 441 of the low and reverse brake servo 116. In addition, main pressure is admitted by the ball valve 448 to the passage 449 and thus to chamber 438 of the low and reverse brake servo 116. Thus, in applying the brake band 115 the piston 426 moves against the bias provided by main pressure in the accumulator chamber 441 and the force of both of the springs 429 and 436 as it strokes toward its band apply position. This provides a smooth brake band engagement to establish the low drive.

In low range operation, an upshift to second gear drive may be had to prevent excessive engine speed. At some vehicle speed higher than that at which a first to second gear shift occurs when operating in intermediate or drive range, the 1-2 shift valve 258 upshifts to its second gear position. At the 2-3 shift valve 290, main pressure from the intermediate range passage 164 acts in chamber 309 on land $b$ of the 2-3 shift valve element 291 to keep it in the downshift position. In low range second gear drive, the clutches 41 and 58 and the overrun brake 86 are engaged and the brake band 115 is released, brake 115 being released by main pressure being admitted to the low and reverse brake servo chamber 439 and the main pressure in accumulator chamber 441. The overrun brake 86 is applied by main pressure admitted to chamber 384 of the overrun brake servo 87 by the 2-3 drive passage 266. The lockout clutch 41 and the forward drive clutch 58 are applied in the same manner as in drive range second gear operation. In low range operation, the main pressure is boosted above normal main pressure as in intermediate range operation.

Reverse

When the manual valve 128 is moved to its reverse position to provide reverse transmission operation, the clutches 41, 69 and brake band 115 are engaged. Clutch 41 is engaged in the same manner as in neutral and all of the previously described drives. The drive range passage 161 is connected to exhaust by the manual valve 128 to release the forward drive clutch 58. Main pressure is admitted by the manual valve to the reverse drive passage 168 which transmits main pressure to the main pressure regulator valve 126 to boost main pressure and also delivers main pressure to the 2-3 shift valve 290 and to chamber 76 of the servo that operates direct drive clutch 69. The 2-3 shift valve 290 is in its downshift position with no governor pressure supply and the 2-3 shift valve thus delivers main pressure from the reverse passage 168 to chamber 75 so that main pressure in both chambers 75 and 76 acts to engage the direct drive clutch 69. Main pressure is delivered from the reverse drive passage 168 by the ball valve 448 to chamber 438 of the low and reverse brake servo 116 to thus effect engagement of the brake band 115. In reverse operation, modulator pressure from the passage 178 acts on boost member 142 of the main pressure regulator valve 126 and main pressure from the reverse passage 168 also acts on this boost member to boost main pressure. In reverse, the main pressure is thus regulated at a higher range of pressure than that in drive range operation. This pressure boost in reverse assures that the clutches 41, 69 and band brake 115 will not slip.

The above described embodiment is illustrative of the invention which may be modified within the scope of the appended claims.

I claim:

1. In a control system for an automatic transmission the combination of transmission means including multiratio gearing and a plurality of fluid pressure operated drive establishing means for providing a plurality of different transmission drives to drive a load on selective delivery of fluid pressure to said fluid pressure operated drive establishing means, a source of fluid pressure, governor valve means operatively connected to said fluid pressure source for providing a governor pressure that changes with load speed, modulator valve means operatively connected to said fluid pressure source for providing a modulator pressure that changes with load torque demand, a plurality of shift valve means responsive to both said governor pressure and said modulator pressure for selectively delivering fluid from said source to said fluid pressure operated drive establishing means to effect establishment of said transmission drives and also automatic shifting between said transmission drives in response to changes in load speed and load torque demand, overdrive governor pressure control valve means operable in an overdrive shift permit position to deliver governor pressure to act on said shift valve means that effects establishment of overdrive to provide for shifting to said overdrive and operable in an overdrive shift prevent position to prevent delivery of said governor pressure to said shift valve means that establishes said overdrive to prevent shifting to said overdrive, means for normally biasing said overdrive governor pressure control valve means to said overdrive shift prevent position, and manually controlled overdrive solenoid valve means for conditioning said overdrive governor pressure control valve means in said overdrive shift permit position.

2. In a control system for an automatic transmission the combination of transmission means including multiratio gearing and a plurality of fluid pressure operated drive establishing means for providing a plurality of different transmission drives including an overdrive and a plurality of lower speed drives to drive a load with said lower speed drives being established by delivery of fluid pressure to one of said fluid pressure operated drive establishing means, exhaust of another of said fluid pressure operated drive establishing means and selective fluid pressure delivery to the remaining fluid pressure operated drive establishing means and with said overdrive being established on exhaust of said one fluid pressure operated drive establishing means and delivery of fluid pressure to said another fluid pressure operated drive establishing means while fluid pressure delivery is maintained to one of said remaining fluid pressure operated drive establishing means, a source of fluid pressure, governor valve means operatively connected to said fluid pressure source for providing a governor pressure that changes with load speed, modulator valve means operatively connected to said fluid pressure source for providing a modulator pressure that changes with load torque demand, overdrive accumulator means for normally delivering fluid pressure from said source to said one fluid pressure operated drive establishing means, a plurality of shift valve means including overdrive shift valve means responsive to both said governor pressure and said modulator pressure for selectively delivering fluid from said source to the remaining fluid pressure operated drive establishing means to effect establishment of said transmission drives and automatic shifting between said transmission drives in response to changes in load speed and load torque demand, said overdrive accumulator means being responsive to the pressure supplied by the said shift valve means that establishes said overdrive to prevent delivery of fluid pressure from said source to said one fluid pressure operated drive establishing means and also to determine the rate of pressure buildup in the said another fluid pressure operated drive establishing means engaging said overdrive, overdrive governor pressure control valve means operable in an overdrive shift permit position to deliver governor pressure to act on said overdrive shift valve means that effects establishment of said overdrive to permit shifting to said overdrive and in an overdrive shift prevent position to prevent delivery of said governor pressure to said overdrive shift valve means to prevent shifting to said overdrive and manually controlled overdrive solenoid valve means for selectively conditioning said overdrive governor pressure control valve means in said overdrive shift permit and shift prevent positions.

3. In a control system for an automatic transmission the combination of transmission means including multiratio gearing and a plurality of fluid pressure operated drive establishing means for providing a plurality of different transmission drives including an overdrive on selective delivery of fluid pressure to said fluid pressure operated drive establishing means, said gearing including an overdrive unit and said fluid pressure operated drive establishing means including a lockup servo which when supplied with fluid pressure locks up said overdrive gearing for the establishment of all transmission drives in speed ranges lower than overdrive and further including an overdrive servo that operates on delivery of fluid pressure thereto to condition said overdrive unit to establish said overdrive, a source of fluid pressure, governor valve means operatively connected to said fluid pressure source for providing a governor pressure that changes with load speed, modulator valve means operatively connected to said fluid pressure source for providing a modulator pressure that changes with load torque demand, a plurality of shift valve means responsive to both said governor pressure and said modulator pressure for selectively delivering fluid from said source to said fluid pressure operated drive establishing means to effect establishment of said transmission drives and automatic shifting between said transmission drives in response to changes in load speed and load torque demand, said shift valve means including overdrive shift valve means operable in a downshift position to exhaust said overdrive servo of pressure and in an upshift position to deliver pressure from said source to said overdrive servo while exhausting said lockup servo, spring means normally biasing said overdrive shift valve means to said downshift position, overdrive governor pressure control valve means operable in an overdrive shift prevent position to prevent governor pressure from acting on said overdrive shift valve means and in an overdrive shift permit position permitting governor pressure to act on said overdrive shift valve means, spring means normally biasing said overdrive governor pressure control valve means to said shift prevent position, first pressure bias means supplied with fluid pressure from said source during engagement of all said transmission drives to bias said overdrive governor pressure control valve means against said spring bias to said shift permit position, second pressure bias means supplied with fluid pressure from said source for assisting said spring means to bias said overdrive governor pressure control valve means to said shift prevent position to overcome the oppositely acting pressure bias provided by said first pressure bias means, overdrive solenoid valve means operable to normally permit said second pressure bias means to bias said overdrive governor pressure control valve means to said shift prevent position and being manually operable to relieve said second pressure bias means to effect movement of said overdrive governor pressure control valve means to said shift permit position to permit shifting to said overdrive.

* * * * *